United States Patent
Ho (10) Patent No.: US 9,008,712 B2
(45) Date of Patent: Apr. 14, 2015

(54) METHOD AND COMMUNICATION DEVICE FOR HANDLING TIME OFFSETS BETWEEN COMMUNICATION DEVICE AND TRANSMISSION POINTS

(71) Applicant: Industrial Technology Research Institute, Hsinchu (TW)

(72) Inventor: Chung-Lien Ho, Hsinchu County (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 0 days.

(21) Appl. No.: 13/733,891

(22) Filed: Jan. 4, 2013

(65) Prior Publication Data

US 2013/0178202 A1   Jul. 11, 2013

Related U.S. Application Data

(60) Provisional application No. 61/583,575, filed on Jan. 5, 2012.

(51) Int. Cl.
| | | |
|---|---|---|
| H04W 4/00 | (2009.01) | |
| H04B 7/00 | (2006.01) | |
| H04B 3/46 | (2006.01) | |
| H04B 17/00 | (2006.01) | |
| H04L 1/00 | (2006.01) | |
| H04L 12/26 | (2006.01) | |
| H04L 12/28 | (2006.01) | |
| H04W 8/00 | (2009.01) | |
| H04W 56/00 | (2009.01) | |
| H04B 7/02 | (2006.01) | |
| H04L 27/26 | (2006.01) | |
| H04B 7/04 | (2006.01) | |
| H04B 7/06 | (2006.01) | |

(52) U.S. Cl.
CPC ............. *H04W 8/00* (2013.01); *H04B 7/024* (2013.01); *H04L 27/2662* (2013.01); *H04W 56/0045* (2013.01); *H04B 7/0417* (2013.01); *H04B 7/0639* (2013.01); *H04L 27/2675* (2013.01)

(58) Field of Classification Search
CPC .... H04B 7/024; H04B 7/0417; H04B 7/0639; H04L 27/2662; H04W 56/0045
USPC ............... 455/517, 422.1; 370/336, 328, 252; 375/226, 224
See application file for complete search history.

(56) References Cited

U.S. PATENT DOCUMENTS

| | | | |
|---|---|---|---|
| 2011/0085460 A1 | 4/2011 | Zhang | |
| 2012/0076038 A1 | 3/2012 | Shan | |
| 2012/0275507 A1* | 11/2012 | Roman et al. ................. | 375/226 |
| 2013/0083780 A1* | 4/2013 | Luo et al. ...................... | 370/336 |

FOREIGN PATENT DOCUMENTS

| | | |
|---|---|---|
| CN | 102118825 A | 7/2011 |
| EP | 2 437 451 A1 | 4/2012 |
| WO | 2010134792 A2 | 11/2010 |
| WO | 2010148319 A1 | 12/2010 |
| WO | 2011079406 A1 | 7/2011 |
| WO | 2011079655 A1 | 7/2011 |

* cited by examiner

*Primary Examiner* — Opiribo Georgewill
(74) *Attorney, Agent, or Firm* — Winston Hsu; Scott Margo (57) ABSTRACT

A method of handling a plurality of time offsets between a communication device of a wireless communication system and a plurality of transmission points of the wireless communication system is disclosed. The method is utilized in the communication device, and comprises obtaining the plurality of time offsets by using a first reference signal; and transmitting the plurality of time offsets to the plurality of transmission points, respectively; wherein the plurality of transmission points compensate the plurality of time offsets, respectively, when communicating with the communication device.

14 Claims, 6 Drawing Sheets

METHOD AND COMMUNICATION DEVICE FOR HANDLING TIME OFFSETS BETWEEN COMMUNICATION DEVICE AND TRANSMISSION POINTS

CROSS REFERENCE TO RELATED APPLICATIONS

This application claims the benefit of U.S. Provisional Application No. 61/583,575, filed on Jan. 5, 2012 and entitled "Provisional application for feedback of time offset for coordinated multi-point (CoMP) joint transmission (JT)", the contents of which are incorporated herein in their entirety.

BACKGROUND OF THE INVENTION

1. Field of the Invention

The present invention relates to a method used in a wireless communication system and related communication device, and more particularly, to a method of handling time offsets between communication device and transmission points and related communication device.

2. Description of the Prior Art

A long-term evolution (LTE) system supporting the 3GPP Rel-8 standard and/or the 3GPP Rel-9 standard are developed by the 3rd Generation Partnership Project (3GPP) as a successor of a universal mobile telecommunications system (UMTS), for further enhancing performance of the UMTS to satisfy increasing needs of users. The LTE system includes a new radio interface and a new radio network architecture that provides a high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple UEs, and communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint transmission/reception (CoMP), UL multiple-input multiple-output (MIMO), etc. For a UE and an eNB to communicate with each other in the LTE-A system, the UE and the eNB must support standards developed for the LTE-A system, such as the 3GPP Rel-10 standard or later versions.

In detail, the CoMP is configured to a UE and multiple transmission points, the UE may communicate with the transmission points simultaneously, i.e., access a service via all or part of the transmission points. For example, a transmission point can be an eNB, a relay node or a remote antenna of an eNB (e.g., remote radio head (RRH)). More specifically, an eNB may manage only one transmission point, or may manage multiple transmission points. That is, Cell IDs of different transmission points may be different (e.g., when being managed by different eNBs), or may be the same (e.g., when being managed by the same eNB). Thus, signals transmitted between the UE and the transmission points can be easily recovered due to better quality of the signals.

Besides, when the transmission points are involved in the CoMP, one of the transmission points is a serving point (i.e., serving cell). In general, link quality between the serving point and the UE is better than link qualities between other transmission points and the UE. Further, the CoMP can be classified into two main categories: Joint Processing (JP) and Coordinated Scheduling/Beamforming (CS/CB). A main difference between the JP and the CS/CB is that data of the UE is available at all the transmission points when the JP is configured (i.e. enabled), while the data of the UE is only available at the serving point when the CS/CB is configured. The JP can be further classified into two categories: joint transmission (JT) and dynamic point selection. When the joint transmission is configured, the data of the UE can be transmitted from multiple transmission points (e.g., coherently or noncoherently) to the UE to improve signal quality and/or cancel interferences. When the dynamic point selection is configured, the data of the UE is transmitted from only one of the transmission points (e.g., according to a choice or suggestion of the UE) to the UE to improve the signal quality and/or avoid the interferences. On the other hand, when the CS/CB is configured, the data of the UE is only transmitted from the serving point to the UE, while other transmission points may adjust scheduling (e.g., stop their transmissions), or adjust beamforming (e.g., move their beams) to mitigate the interferences caused to the UE.

However, a time delay between the UE and a transmission point leads to a frequency selectivity and causes mismatch to a preferred matrix index (PMI) (i.e., precoding matrix indicator), so as to degrade throughput of the UE. In general, the time delay may be introduced by channel propagation delay (e.g., a number of microseconds) due to scattering and a distance between the UE and the transmission point. Alternatively, the time delay may also come from a time offset between the UE and the transmission point. The time delay caused by time offset results in considerable frequency selectivity, i.e., a reduced coherence bandwidth. Feeding back the PMI for each 4 resource blocks (RBs) is not sufficient according to the prior art, since channel frequency response (CFR) may vary within a resource block due to the time offset. Thus, compensating the time offset becomes an important topic to be discussed and addressed.

SUMMARY OF THE INVENTION

The present invention therefore provides a method and related communication device for handling time offsets between communication device and transmission points to solve the abovementioned problems.

A method of handling a plurality of time offsets between a communication device of a wireless communication system and a plurality of transmission points of the wireless communication system is disclosed. The method is utilized in the communication device, and comprises obtaining the plurality of time offsets by using a first reference signal; and transmitting the plurality of time offsets to the plurality of transmission points, respectively; wherein the plurality of transmission points compensate the plurality of time offsets, respectively, when communicating with the communication device.

A method of handling a time offset between a communication device of a wireless communication system and a transmission point of the wireless communication system is disclosed. The method is utilized in the transmission point, and comprises receiving the time offset transmitted by the communication device; and compensating at least one resource block according to the time offset, before transmitting the at least one resource block to the communication device.

A communication device of a wireless communication system for handling a plurality of time offsets between the communication device and a plurality of transmission points of the wireless communication system is disclosed. The communication device comprises means for obtaining the plurality of time offsets by using a first reference signal; and means for transmitting the plurality of time offsets to the plurality of transmission points, respectively; means for wherein the plurality of transmission points compensate the plurality of time offsets, respectively, when communicating with the communication device.

A transmission point of a wireless communication system for handling a time offset between a communication device of the wireless communication system and the transmission point is disclosed. The transmission point comprises means for receiving the time offset transmitted by the communication device; and means for compensating at least one resource block according to the time offset, before transmitting the at least one resource block to the communication device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
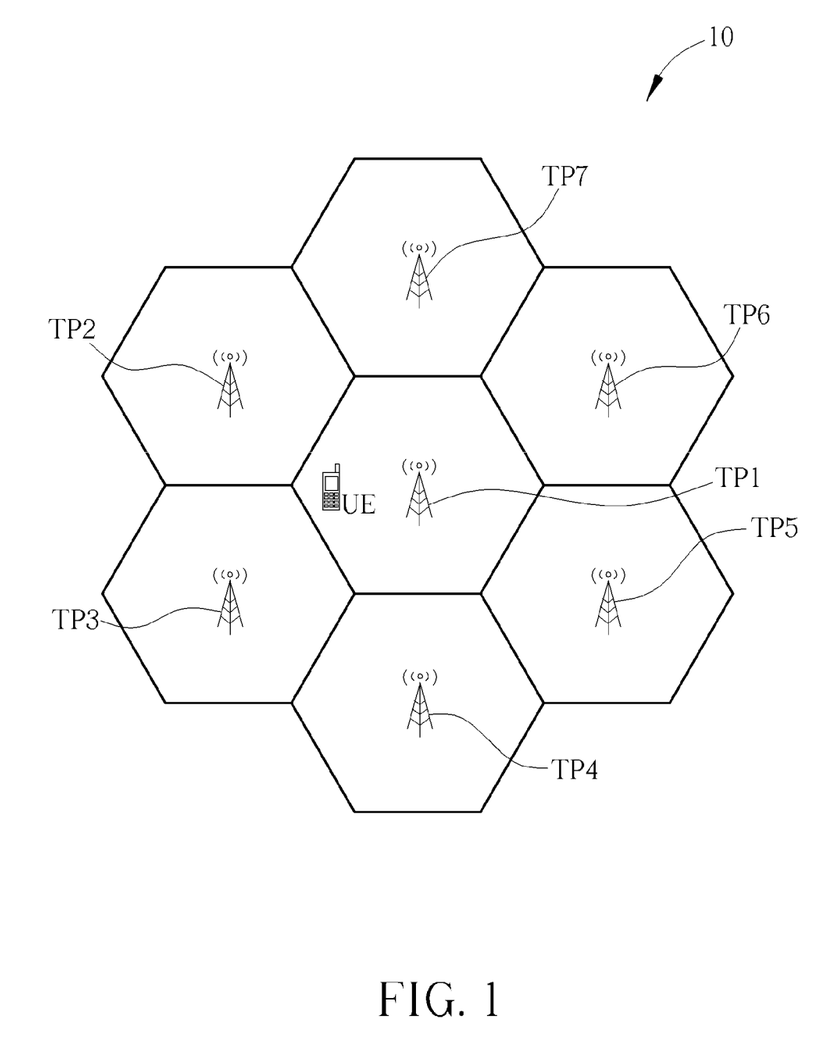
FIG. 1 is a schematic diagram of a wireless communication system according to an example the present invention.

Please refer to FIG. 1, which is a schematic diagram of a wireless communication system 10 according to an example of the present invention. The wireless communication system 10 is briefly composed of a UE and 7 transmission points TP1-TP7, wherein each of the transmission points TP1-TP7 can perform data transmissions and receptions with the UE. The wireless communication system 10 may be a wideband code division multiple access (WCDMA) system such as a universal mobile telecommunications system (UMTS). Alternatively, the wireless communication system 10 may be an orthogonal frequency division multiplexing (OFDM) system and/or an orthogonal frequency division multiple access (OFDMA) system, such as a long term evolution (LTE) system, a LTE-Advanced (LTE-A) system or a successor of the LTE-A system.

Please note that, the UE and the transmission points TP1-TP7 are simply utilized for illustrating a structure of the wireless communication system 10. Practically, the transmission points TP1-TP7 can be referred as NodeBs (NBs) in a universal terrestrial radio access network (UTRAN) of the UMTS. Alternatively, the transmission points TP1-TP7 can be evolved NodeBs (eNBs), relay nodes and/or remote radio heads (RRHs) in an evolved UTRAN (E-UTRAN) of the LTE system or the LTE-A system, and are not limited herein. The UE can be mobile devices such as mobile phones, laptops, tablet computers, electronic books, and portable computer systems. Besides, a transmission point and the UE can be seen as a transmitter or a receiver according to transmission direction, e.g., for an uplink (UL), the UE is the transmitter and the transmission point is the receiver, and for a downlink (DL), the transmission point is the transmitter and the UE is the receiver.

Besides, the wireless communication system 10 can be seen as a multi-point cooperative network composed of multiple transmission points. That is, the UE may transmit a signal (e.g., a packet) to a first set of the transmission points TP1-TP7, and the UE may receive signals transmitted by a second set of the transmission points TP1-TP7, wherein the first set and the second set may be the same or different. As a result, signal quality of the signals is improved. For example, when the wireless communication system 10 is referred to the LTE-A system, it means that the wireless communication system 10 supports coordinated multi-point (CoMP) transmission/reception. The CoMP can be configured as Joint Processing (JP) (e.g., joint transmission (JT) or dynamic point selection) or Coordinated Scheduling/Beamforming (CS/CB), and is not limited. Further, without loss of generality, the transmission point TP1 can be seen as a serving point (i.e., serving cell) for the UE, wherein link quality between the transmission point TP1 and the UE is better than link qualities between other transmission points and the UE. Note that the serving point can be determined by the UE, the serving point, coordination between transmission points within a cooperating set (e.g., the transmission points TP1-TP3) of the UE and/or coordination between the transmission points TP1-TP7, and is not limited.

Figure 2:
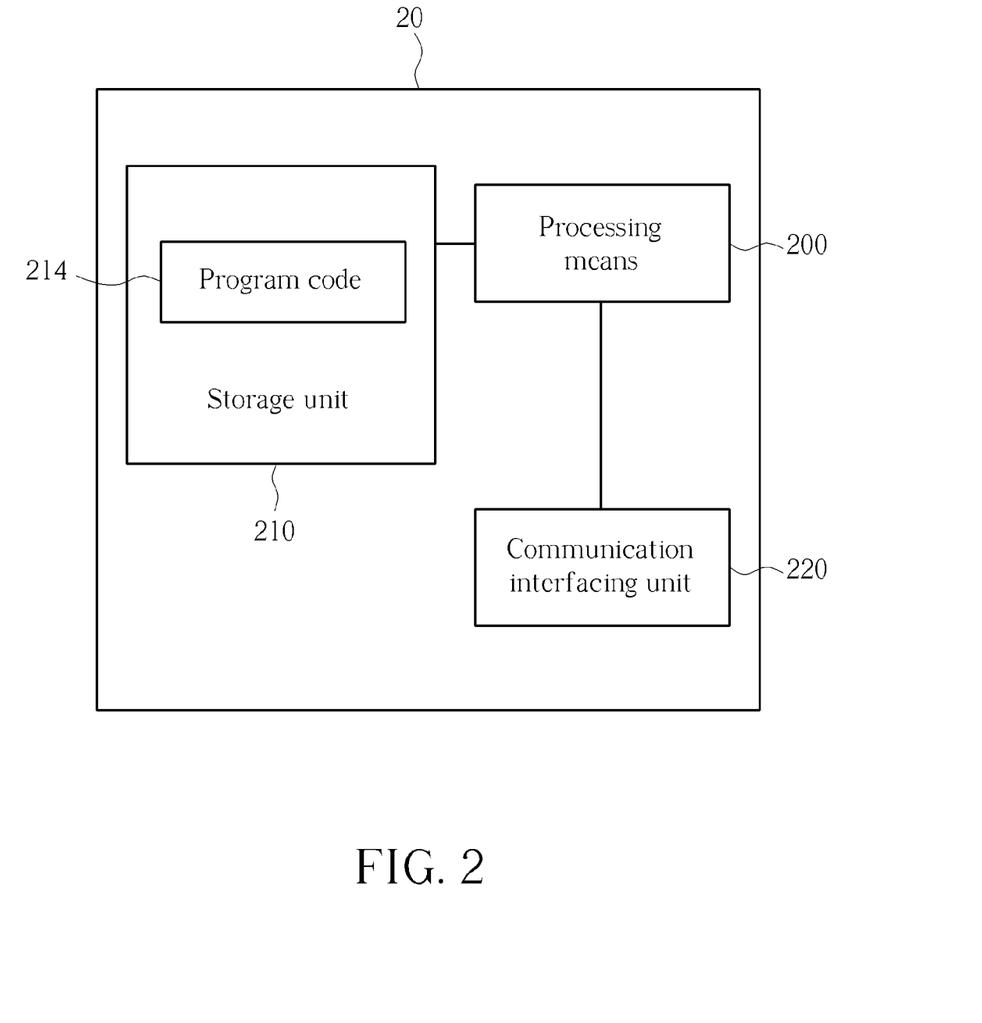
FIG. 2 is a schematic diagram of a communication device according to an example to the present invention.

Please refer to FIG. 2, which is a schematic diagram of a communication device 20 according to an example of the present invention. The communication device 20 can be the UE or a transmission point shown in FIG. 1, but is not limited herein. The communication device 20 may include a processing means 200 such as a microprocessor or an Application Specific Integrated Circuit (ASIC), a storage unit 210 and a communication interfacing unit 220. The storage unit 210 may be any data storage device that can store a program code 214, accessed by the processing means 200. Examples of the storage unit 210 include but are not limited to a subscriber identity module (SIM), read-only memory (ROM), flash memory, random-access memory (RAM), CD-ROM/DVD-ROM, magnetic tape, hard disk, and optical data storage device. The communication interfacing unit 220 is preferably a radio transceiver, and can transmit and receive wireless signals according to processing results of the processing means 200.

Figure 3:
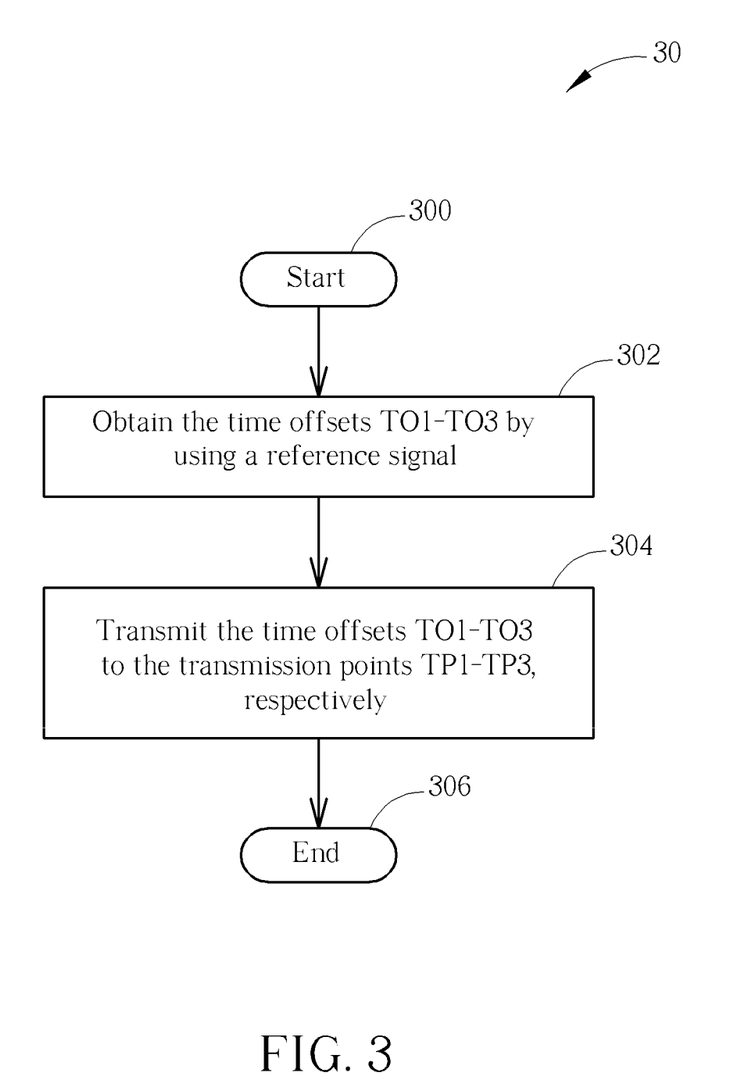
FIG. 3 is a flowchart of a process according to an example of the present invention.

Please refer to FIG. 3, which is a flowchart of a process 30 according to an example of the present invention. The process 30 is utilized in the UE shown in FIG. 1, for handling time offsets TO1-TO3 between the UE and the transmission points TP1-TP3. The process 30 may be compiled into the program code 214 and includes the following steps:

Step 300: Start.

Step 302: Obtain the time offsets TO1-TO3 by using a reference signal.

Step 304: Transmit the time offsets TO1-TO3 to the transmission points TP1-TP3, respectively.

Step 306: End.

According to the process 30, the UE first obtains (e.g., estimates) the time offsets TO1-TO3 (e.g., estimated time offsets) by using a reference signal. Then, the UE transmits the time offsets TO1-TO3 to the transmission points TP1-TP3, respectively. For example, the UE may transmit the time offsets TO1-TO3 via a control channel (e.g., physical uplink control channel (PUCCH)) to the transmission points TP1-TP3. Note that the reference signal can be any signal known by the UE, e.g., a channel state information reference signal (CSI-RS). Besides, the transmission points TP1-TP3 (with corresponding time offsets TO1-TO3) are simply used for illustrating an example of the present invention. Practically, more (or less) transmission points may communicate with the UE at the same time. Thus, after receiving the time offsets TO1-TO3, the transmission points TP1-TP3 can compensate the time offsets TO1-TO3 (e.g., via performing precoding according to the time offsets TO1-TO3) when communicating with the UE (e.g., when transmitting resource blocks (RBs) to the UE). As a result, throughput of the UE can be improved, and does not degrade due to effect (e.g., phase distortion, precoding matrix mismatch, etc.) of the time offsets TO1-TO3.

Please note that, a spirit of the process 30 is that a UE feeds back time offsets corresponding to transmission points which currently communicate with the UE, such that throughput of the UE can be improved. Realization of the process 30 is not limited.

For example, the UE can generate quantized time offsets by performing a quantization (e.g., linear quantization) on the time offsets TO1-TO3, respectively. Then, the UE transmits the quantized time offsets to the transmission points TP1-TP3, respectively. Note that a range (i.e., quantization range) of the quantization can be related to a requirement on the time offsets TO1-TO3, so as to make the quantized time offsets satisfying the requirement. For example, the UE can simply transmits an indicator indicating a quantized time offset nearest to a time offset without transmitting an actual value of the time offset. An example of the linear quantization is stated as follows:

$$Q_n = L_{ini} + n \cdot (2 \cdot \Delta_{req}), n = 0, 1, \ldots, \left\lfloor \frac{L_{req} - L_{ini}}{2\Delta_{req}} \right\rfloor, \quad \text{(Eq. 1)}$$

where $2\Delta_{req}$ is the step size of the linear quantization, $(0, L_{req})$ is the range of the linear quantization, $L_{ini}$ is the initial value of the linear quantization. Considering a 3-bit linear quantization case with $2\Delta_{req}=0.429$ μs, $L_{ini}=0$ and $L_{req}=3$ μs, quantized time offsets (0, 0.43, 0.86, 1.29, 1.71, 2.14, 2.57, 3.0) (i.e., codebook) can be determined. Considering another example for the 3-bit linear quantization with $2\Delta_{req}=0.6$ μs, $L_{ini}=0$ and $L_{req}=3$ μs, quantized time offsets (0, 0.6, 1.2, 1.8, 2.4, 3.0) (i.e., codebook) can be determined. Alternatively, quantized time offsets (0.19, 0.56, 0.94, 1.31, 1.69, 2.05, 2.44, 2.81) (i.e., codebook) can be determined according to another 3-bit linear quantization with $2\Delta_{req}=0.375$ μs, $L_{ini}=\Delta_{req}=0.1875$ μs and $L_{req}=3$ μs. Thus, the UE only needs to transmit 3 bits to a transmission point for indicating a specific quantized time offset. Note that the parameters stated above can be changed according to system requirements and design considerations, and are not limited herein. As a result, overhead caused by transmitting the timing offset can be reduced.

Furthermore, the UE can also transmit precoding matrix indicators (PMIs) (i.e., preferred matrix indices) to the transmission points TP1-TP3, for the transmission points TP1-TP3 to compensate effects of channel variation and time offset. For example, the UE may transmit the PMIs via a control channel (e.g., physical uplink shared channel (PUSCH)) to the transmission points TP1-TP3. In detail, the UE first obtains (e.g., estimates) channel information between the UE and the transmission points TP1-TP3 by using a reference signal. Note that the reference signal may be the same as that used for obtaining the time offsets. Alternatively, the reference signal may be another reference signal (e.g., dedicated for the channel information) for obtaining the channel information. Then, the UE determines precoding matrix indicators PMI1-PMI3 corresponding to the transmission points TP1-TP3, respectively, according to the channel information, and transmits the precoding matrix indicators PMI1-PMI3 to the transmission points TP1-TP3, respectively. Preferably, the UE transmits the time offsets TO1-TO3 periodically with a first period, and the first period is greater than a second period for transmitting the precoding matrix indicators PMI1-PMI3 periodically. That is, the time offsets TO1-TO3 can be fed back less frequently than the precoding matrix indicators PMI1-PMI3, since the time offsets TO1-TO3 usually vary slowly (especially true when the UE is in a low-mobility environment). Thus, the transmission points TP1-TP3 can use both the time offsets TO1-TO3 and the precoding matrix indicators PMI1-PMI3, to further improve the throughput of the UE. At the same time, overhead for further improving the throughput can be controlled (e.g., reduced or kept) according to system requirements and design considerations, since the time offsets TO1-TO3 are transmitted less frequently.

Please note that, the abovementioned time offsets TO1-TO3 can be actual values of the time offsets TO1-TO3. Alternatively, the time offsets TO1-TO3 can be relative values of the time offsets TO1-TO3 with respect to (e.g., subtracted by) an actual time offset of a reference point (e.g., the transmission point TP1) in a cooperating set (e.g., the transmission points TP1-TP3). That is, the UE may not need to transmit a time offset to the transmission point TP1 (e.g., since the UE have synchronized with the transmission point TP1), and the UE only transmits (TO2-TO1) and (TO3-TO1) to the transmission points TP2 and TP3, respectively. In this situation, the transmission point TP1 does not need to compensate the time offset, but only needs to compensate the channel variation according to the precoding matrix indicator. Besides, the reference point and/or the cooperating set may be selected from the transmission points TP1-TP7 according to at least one of time delays, signal amplitudes, channel qualities, reference signal received powers (RSRPs) and reference signal received qualities (RSRQs) of the transmission points TP1-TP7, and is not limited herein. Note that, the transmission point TP1 is assumed as both the reference point and the serving point in the above example. However, this is not a requirement for realizing the present invention, and the reference point and the serving point can be different transmission points.

According to the above description, after receiving information (e.g., time offset and/or precoding matrix indicator) transmitted by the UE, the transmission point can compensate the time offset and the channel variation according to the information.

Figure 4:
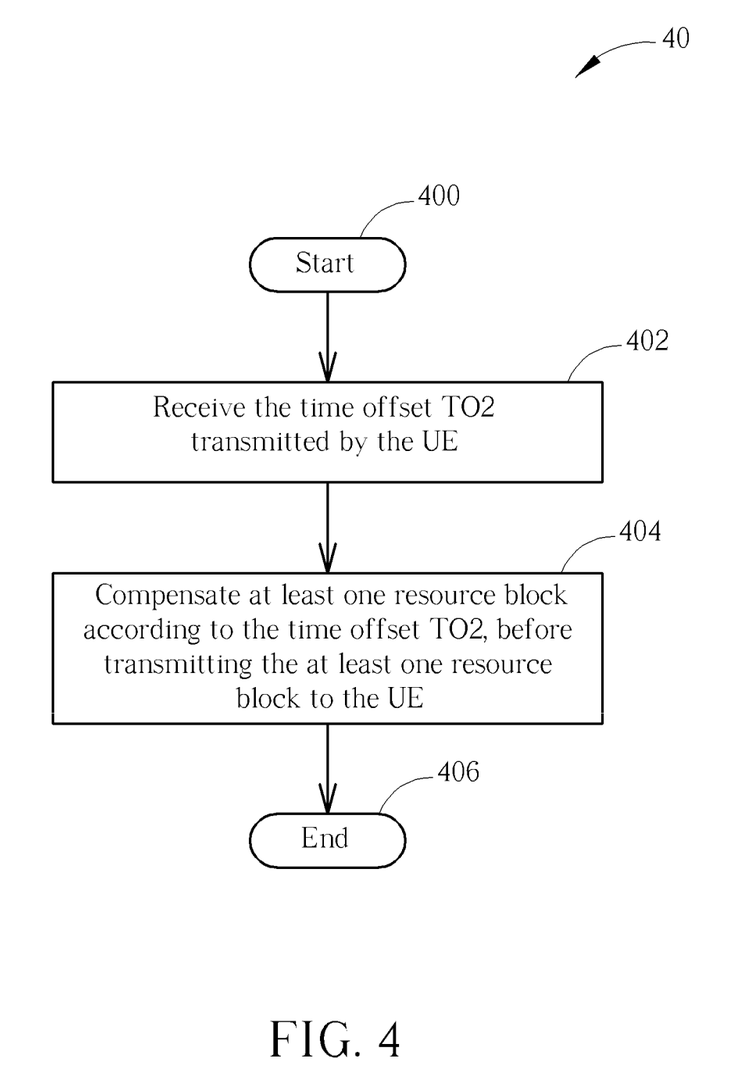
FIG. 4 is a flowchart of a process according to an example of the present invention.

Please refer to FIG. 4, which is a flowchart of a process 40 according to an example of the present invention. The process 40 is utilized in a transmission point (e.g., transmission point TP2) shown in FIG. 1, for handling the time offset TO2 between the UE and the transmission point TP2. The process 40 may be compiled into the program code 214 and includes the following steps:

Step 400: Start.

Step 402: Receive the time offset TO2 transmitted by the UE.

Step 404: Compensate at least one resource block according to the time offset TO2, before transmitting the at least one resource block to the UE.

Step 406: End.

According to the process 40, after receiving the time offset TO2 transmitted by the UE, the transmission point TP2 compensates at least one resource block according to the time offset TO2, before transmitting the at least one resource block to the UE. That is, before transmitting the at least one resource block to the UE, the transmission point TP2 compensates the time offset TO2 (e.g., via phase rotation or precoding), such that effect (e.g., phase distortion, precoding matrix mismatch, etc.) due to the time offset TO2 can be removed or mitigated. As a result, throughput of the UE (as well as throughput of the wireless communication system 10) can be improved, and does not degrade due to effect (e.g., phase distortion, precoding matrix mismatch, etc.) caused by the time offset TO2.

Please note that, a spirit of the process 40 is that a transmission point performing compensation according to a time offset transmitted (i.e., fed back) by the UE, such that effect (e.g., phase distortion, precoding matrix mismatch, etc.) due to the time offset can be removed or mitigated. Realization of the process 40 is not limited.

For example, the transmission point can compensate at least one resource block including only data and a reference signal (e.g., demodulation reference signal (DM-RS)) dedicated to the UE. That is, since time offsets between the transmission point and different UEs may be different (e.g., due to different locations and/or movements of the UEs), detail (e.g., parameters) of compensation for a UE depends on the time offset between the transmission point and the UE. Thus, the transmission point should compensate only the data and the reference signal dedicated to the UE. From another point of view, the transmission point should not perform compensation specific for a UE on at least one resource block comprising common information for multiple UEs. Since the compensation specific for the UE may not be proper for other UEs, throughput of other UEs may degrade due to improper compensation. In general, the common information may include a synchronization signal, system information (e.g., master information blocks (MIBs), system information blocks (SIBs), paging signal, etc.), a control signal (e.g., uplink grant, downlink assignment, power control signaling, etc.), a cell-specific reference signal (CRS) and/or a positioning reference signal (PRS), but is not limited herein.

As mentioned previously, the UE can also transmit a precoding matrix indicator to a transmission point except a time offset. Correspondingly, after receiving the time offset and the precoding matrix indicator, the transmission point can compensate at least one resource block according to the time offset and the precoding matrix indicator before transmitting the at least one resource block to the UE. Besides, the UE preferably transmits the time offset periodically to the transmission point with a first period, and the first period is greater than a second period for transmitting the precoding matrix indicator to the transmission point periodically. Correspondingly, the transmission point receives the time offset periodically with the first period, and the precoding matrix indicator periodically with the second period.

Figure 5:
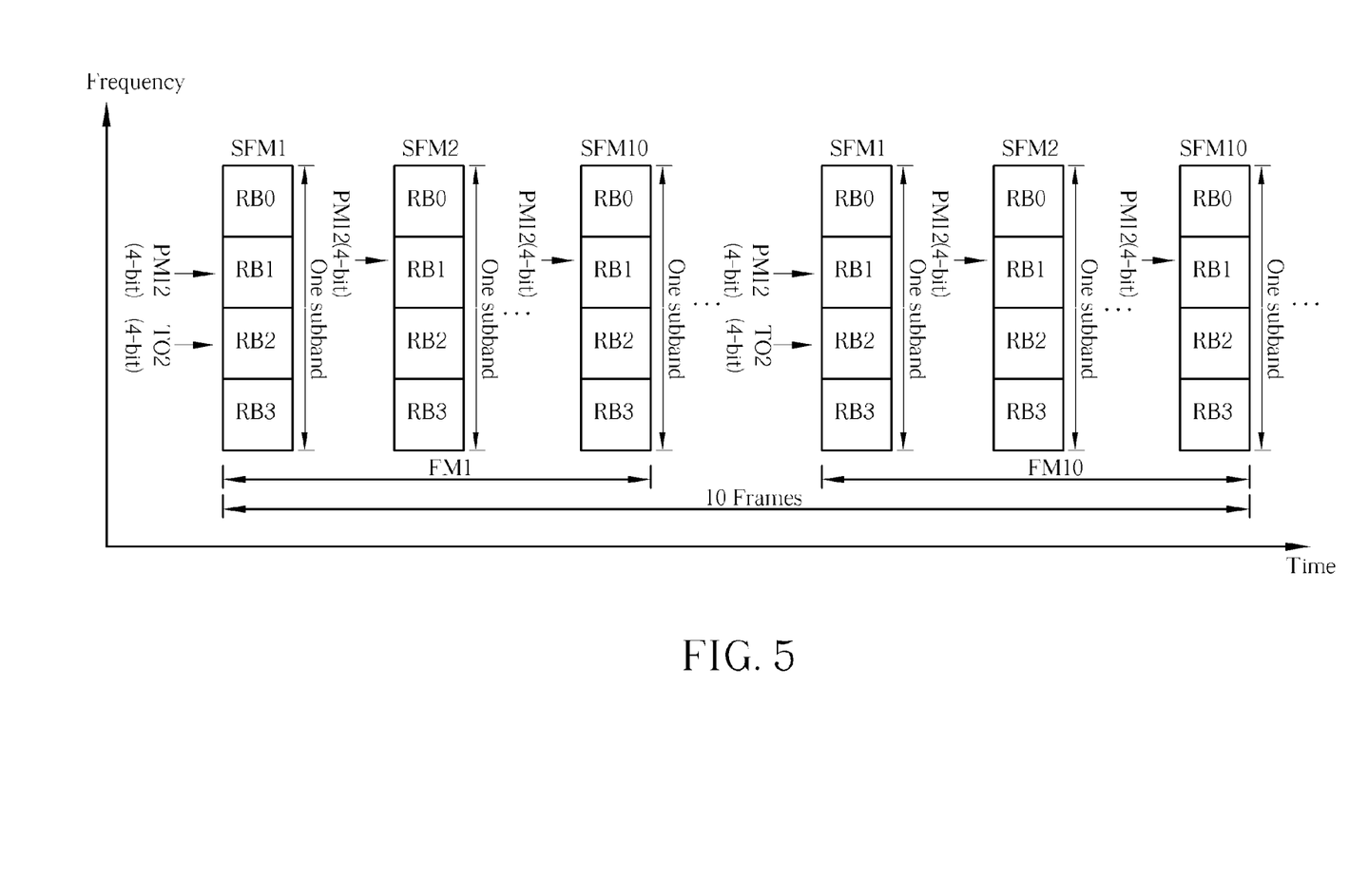
FIG. 5 is a schematic diagram of processing downlink resource blocks according to an example of the present invention.

Please refer to FIG. 5, which is a schematic diagram of processing downlink resource blocks according to the present invention. FIG. 5 is used for illustrating an example that the transmission point TP2 processes (e.g., precodes) the resource blocks, after receiving the precoding matrix indicator PMI2 and the time offset TO2 transmitted by the UE. As shown in FIG. 5, 10 frames FM1-FM10 are considered, wherein each of the frames FM1-FM10 includes 10 subframes SFM1-SFM10. Further, one subband including 4 resource blocks RB0-RB3 is considered in the present example, and examples with more subbands including more resource blocks can easily be obtained. In detail, the transmission point TP2 receives the precoding matrix indicator PMI2 (e.g., represented in 4 bits) transmitted by the UE in each of the subframes SFM1-SFM10 of the frames FM1-FM10. That is, the UE transmits the precoding matrix indicator PMI2 to the transmission point TP2 periodically with the period of one subframe. On the other hand, since a time offset usually varies slowly (i.e., a semi-static statistics), the transmission point TP2 only receives the time offset TO2 transmitted by the UE in a particular subframe (e.g., the subframe SFM1) of each of the frames FM1-FM10. That is, the UE transmits the time offset TO2 to the transmission point TP2 periodically with the period of one frame which is greater than the period for transmitting the precoding matrix indicator PMI2. Thus, before receiving a new (i.e., updated) time offset from the UE, the transmission point TP2 can keep using a received (i.e., old) time offset (e.g., for the per-subcarrier compensation or the precoding) for the subband (i.e., the resource blocks RB0-RB3). After receiving the new time offset, the transmission point TP2 can start to use the new time offset for the subband. Similarly, before receiving a new (i.e., updated) precoding matrix indicator from the UE, the transmission point TP2 can keep performing the precoding on the subband (i.e., the resource blocks RB0-RB3) by using a received (i.e., old) precoding matrix indicator. After receiving the new precoding matrix indicator, the transmission point TP2 can perform the precoding on the subband by using the new precoding matrix indicator. As a result, the transmission point TP2 can use both the time offset TO2 and the precoding matrix indicator PMI2, to further improve the throughput of the UE, while overhead for further improving the throughput can be controlled (e.g., reduced or kept).

Furthermore, a transmission point can compensate one or more resource blocks by rotating phases of the one or more resource blocks according to a time offset. That is, the transmission point can compensate the time offset via rotating signals (i.e., increasing/decreasing phases of the signals) on subcarriers of the one or more resource blocks in a frequency domain (e.g., per-subcarrier compensation), while the channel variation is compensated via the precoding according to a precoding matrix indicator. For example, before transmitting modulation samples $S(k)$, $k=0, \ldots, (N-1)$ on the subcarriers to the UE, the transmitting point can compensate the modulation samples via the following equation:

$$s((n - \Delta n) \bmod N) = \frac{1}{\sqrt{N}} \sum_{k=0}^{N-1} \left( S(k) e^{-j\frac{2\pi k n}{N}} \right) e^{j\frac{2\pi k n}{N}}, \quad \text{(Eq. 2)}$$

$$n = 0, \ldots, (N-1),$$

where $\Delta n$ is the time offset, and "mod N" is the modulo-N operation. As can be seen in Eq.2, $s(n)$ can be compensated (i.e., via shifting $\Delta n$) by rotating the modulation samples $S(k)$, $k=0, \ldots, (N-1)$ by $-2\pi k \Delta n/N$, $k=0, \ldots, (N-1)$, respectively.

Alternatively, the transmission point can compensate the time offset and the channel variation jointly by using the precoding according to both the time offset and the precoding matrix indicator as stated above. For example, the precoding can be realized via using a precoding structure described as follows:

$$W = F \cdot W_0, \quad \text{(Eq.3)}$$

where F is a phase rotation matrix (i.e., inter-point phase matrix) comprising elements related to the time offset for compensating the time offset, and $W_0$ is a base precoding matrix corresponding to the precoding matrix indicator for compensating the channel variation. Further, $W_0=V$ for non-coherent JT and $W_0=G \cdot V$ for coherent JT can be obtained, wherein V is a per-point precoding matrix and G is an inter-point precoding matrix. More specifically, $G=G_1 \cdot G_2$ can be obtained, wherein $G_1$ is an inter-point amplitude/covariance/polarization matrix and $G_2$ is an inter-point phase matrix for coherent combining. As can be seen from the above, F and $G_1$ can be updated less frequently due to that the UE feeds back the time offset with a lower frequency, and $G_2$ and V can be updated frequently due to the UE feeds back the precoding matrix indicator with a higher frequency. Note that the present example simply provides a precoding structure for compensating the time offset and the channel variation via the precoding. Those skilled in the art can readily make modifications or alterations according to the present example.

Figure 6:
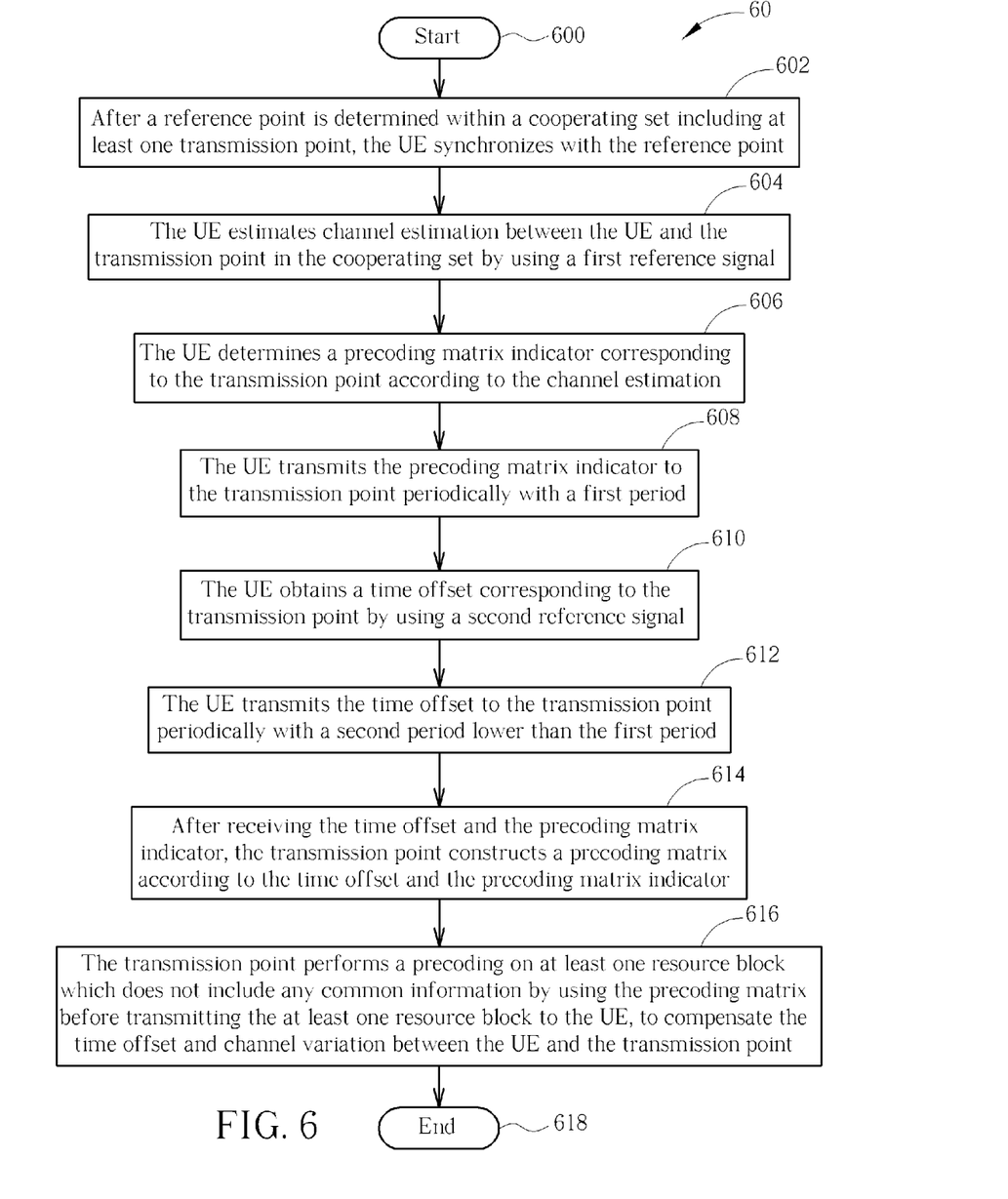
FIG. 6 is a flowchart of a process according to an example of the present invention.

According to the above description, operations of the wireless communication system 10 (i.e., interactions between a transmission point and the UE) can be summarized into a process 60 as shown in FIG. 6. The process 60 includes the following steps:

Step 600: Start.

Step 602: After a reference point is determined within a cooperating set including at least one transmission point, the UE synchronizes with the reference point.

Step 604: The UE estimates channel estimation between the UE and the transmission point in the cooperating set by using a first reference signal.

Step 606: The UE determines a precoding matrix indicator corresponding to the transmission point according to the channel estimation.

Step 608: The UE transmits the precoding matrix indicator to the transmission point periodically with a first period.

Step 610: The UE obtains a time offset corresponding to the transmission point by using a second reference signal.

Step 612: The UE transmits the time offset to the transmission point periodically with a second period greater than the first period.

Step 614: After receiving the time offset and the precoding matrix indicator, the transmission point constructs a precoding matrix according to the time offset and the precoding matrix indicator.

Step 616: The transmission point performs a precoding on at least one resource block which does not include any common information by using the precoding matrix before transmitting the at least one resource block to the UE, to compensate the time offset and channel variation between the UE and the transmission point.

Step 618: End.

Operations and variations of the process 60 can be referred to the above illustration, and are not narrated herein. Note that the process 60 simply illustrates the case including the UE and a single transmission point. However, cases including the UE and multiple transmission points can be readily obtained.

Those skilled in the art should readily make combinations, modifications and/or alterations on the abovementioned description and examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

To sum up, the present invention provides methods for handling time offsets between communication device and transmission points, to remove or mitigate effects of the time offsets such as phase distortion, precoding matrix mismatch, etc. Thus, throughput of the UE can be improved, while overhead for further improving the throughput can be controlled (e.g., reduced or kept) according to system requirements and design considerations.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling a plurality of time offsets between a communication device of a wireless communication system and a plurality of transmission points of the wireless communication system, the method being utilized in the communication device and comprising:

obtaining the plurality of time offsets by using a first reference signal;

determining a plurality of quantized time offsets by performing a quantization on the plurality of time offsets, respectively; and transmitting the plurality of quantized time offsets to the plurality of transmission points, respectively;

wherein the plurality of transmission points compensate the plurality of time offsets, respectively, when communicating with the communication device;

wherein the quantization is a linear quantization represented by the following equation:

$$Q_n = L_{ini} + n \cdot (2 \cdot \Delta_{req}), n = 0, 1, \ldots, \left\lfloor \frac{L_{req} - L_{ini}}{2\Delta_{req}} \right\rfloor,$$

where $2\Delta_{req}$ is a step size of the linear quantization, (0, $L_{req}$) is a range of the linear quantization, and $L_{ini}$ is an initial value of the linear quantization.

2. The method of claim 1, wherein a range of the quantization is related to a requirement on the plurality of time offsets.

3. The method of claim 1, wherein the linear quantization is a 3-bit linear quantization with $2\Delta_{req}=0.429$ μs, $L_{ini}=0$ and $L_{req}=3$ μs, for determining the plurality of quantized time offsets of (0, 0.43, 0.86, 1.29, 1.71, 2.14, 2.57, 3.0), with $2\Delta_{req}=0.6$ μs, $L_{ini}=0$ and $L_{req}=3$ μs, for determining the plurality of quantized time offsets of (0, 0.6, 1.2, 1.8, 2.4, 3.0), or with $2\Delta_{req}=0.375$ μs, $L_{ini}=\Delta_{req}=0.1875$ μs and $L_{req}=3$ μs, for determining the plurality of quantized time offsets of (0.19, 0.56, 0.94, 1.31, 1.69, 2.05, 2.44, 2.81).

4. The method of claim 1, further comprising:

obtaining channel information between the communication device and the plurality of transmission points by using a second reference signal;

determining a plurality of precoding matrix indicators corresponding to the plurality of transmission points, respectively, according to the channel information; and transmitting the plurality of precoding matrix indicators to the plurality of transmission points, respectively.

5. The method of claim 4, wherein the communication device transmits the plurality of time offsets periodically with a first period, and the first period is greater than a second period for transmitting the plurality of precoding matrix indicators periodically.

6. The method of claim 1, wherein the plurality of transmission points are in a cooperating set, one of the plurality of transmission points is a reference point, and the plurality of time offsets are relative time offsets of the plurality of transmission points with respect to an actual time offset of the reference point, respectively.

7. The method of claim 6, wherein the reference point is selected from the plurality of transmission points according to at least one of time delays, signal amplitudes, channel qualities, reference signal received powers (RSRPs) and reference signal received qualities (RSRQs) of the plurality of transmission points.

8. A communication device of a wireless communication system for handling a plurality of time offsets between the communication device and a plurality of transmission points of the wireless communication system, the communication device comprising:

means for obtaining the plurality of time offsets by using a first reference signal;

means for determining a plurality of quantized time offsets by performing a quantization on the plurality of time offsets, respectively; and means for transmitting the plurality of quantized time offsets to the plurality of transmission points, respectively;

wherein the plurality of transmission points compensate the plurality of time offsets, respectively, when communicating with the communication device;

wherein the quantization is a linear quantization represented by the following equation:

$$Q_n = L_{ini} + n \cdot (2 \cdot \Delta_{req}), n = 0, 1, \ldots, \left\lfloor \frac{L_{req} - L_{ini}}{2\Delta_{req}} \right\rfloor,$$

where $2\Delta_{req}$ is a step size of the linear quantization, (0, $L_{req}$) is a range of the linear quantization, and $L_{ini}$ is an initial value of the linear quantization.

9. The communication device of claim 8, wherein a range of the quantization is related to a requirement on the plurality of time offsets.

10. The communication device of claim 8, wherein the linear quantization is a 3-bit linear quantization with $2\Delta_{req}$=0.429 μs, $L_{ini}$=0 and $L_{req}$=3 μs, for determining the plurality of quantized time offsets of (0, 0.43, 0.86, 1.29, 1.71, 2.14, 2.57, 3.0), with $2\Delta_{req}$=0.6 μs, $L_{ini}$=0 and $L_{req}$=3 μs, for determining the plurality of quantized time offsets of (0, 0.6, 1.2, 1.8, 2.4, 3.0), or with $2\Delta_{req}$=0.375 μs, $L_{ini}$=$\Delta_{req}$=0.1875 μs and $L_{req}$=3 μs, for determining the plurality of quantized time offsets of (0.19, 0.56, 0.94, 1.31, 1.69, 2.05, 2.44, 2.81).

11. The communication device of claim 8, further comprising:

means for obtaining channel information between the communication device and the plurality of transmission points by using a second reference signal;

means for determining a plurality of precoding matrix indicators corresponding to the plurality of transmission points, respectively, according to the channel information; and means for transmitting the plurality of precoding matrix indicators to the plurality of transmission points, respectively.

12. The communication device of claim 11, wherein the communication device transmits the plurality of time offsets periodically with a first period, and the first period is greater than a second period for transmitting the plurality of precoding matrix indicators periodically.

13. The communication device of claim 8, wherein the plurality of transmission points are in a cooperating set, one of the plurality of transmission points is a reference point, and the plurality of time offsets are relative time offsets of the plurality of transmission points with respect to an actual time offset of the reference point, respectively.

14. The communication device of claim 13, wherein the reference point is selected from the plurality of transmission points according to at least one of time delays, signal amplitudes, channel qualities, reference signal received powers (RSRPs) and reference signal received qualities (RSRQs) of the plurality of transmission points.

* * * * *